A. STEARNS.
Apparatus for Molding and Perforating Plastic Substances.
No. 224,239. Patented Feb. 3, 1880.
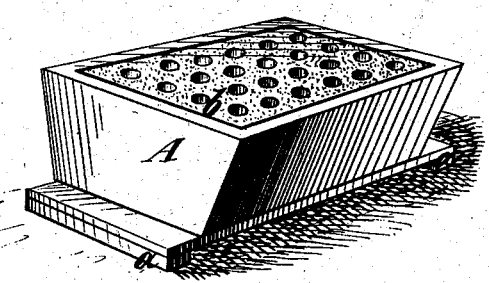
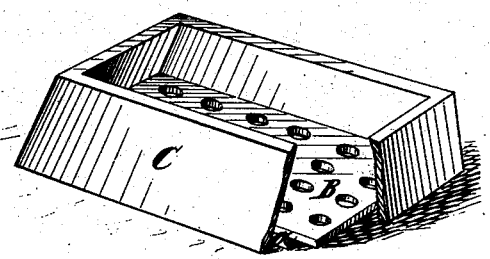
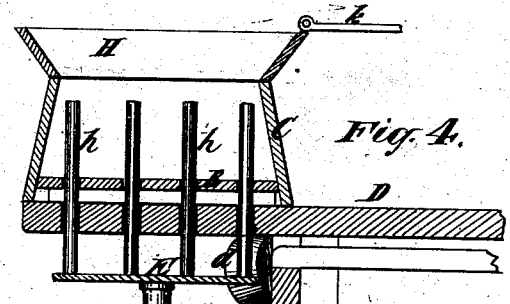
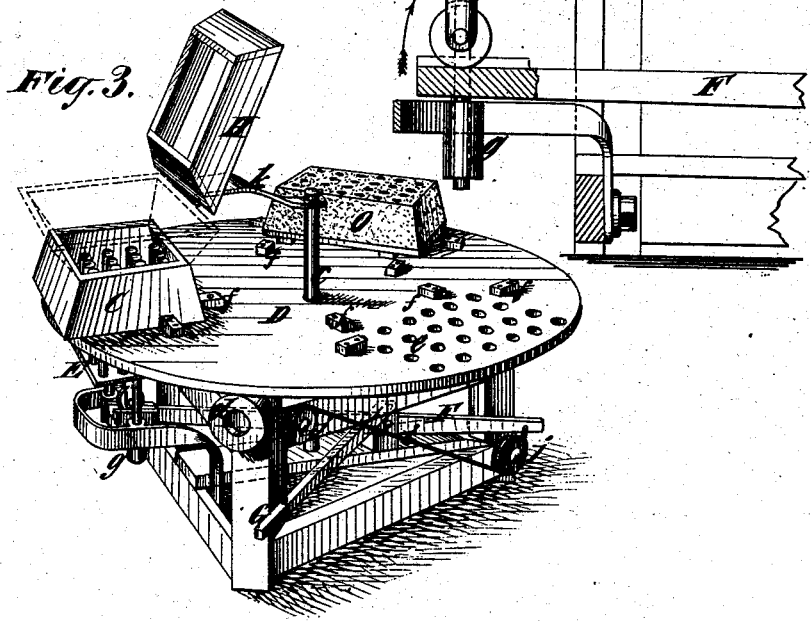
Witnesses
John Becker
Fred K Haynes
Inventor
Albert Stearns
by Attorneys
Brown & Brown

UNITED STATES PATENT OFFICE.

ALBERT STEARNS, OF BROOKLYN, NEW YORK.

APPARATUS FOR MOLDING AND PERFORATING PLASTIC SUBSTANCES.

SPECIFICATION forming part of Letters Patent No. 224,239, dated February 3, 1880.

Application filed June 14, 1879.

*To all whom it may concern:*

Be it known that I, ALBERT STEARNS, of Brooklyn, in Kings county and State of New York, have invented certain new and useful Improvements in Apparatus for Molding and Perforating Plastic Substances, of which the following is a specification.

My apparatus may be used for molding various plastic substances into self-sustaining blocks, and for perforating said blocks, so as to increase the amount of exposed surface.

My invention consists in a novel construction of charging-frame for use in connection with my apparatus in molding plastic substances into perforated blocks, and of such construction that the blocks may be readily removed therefrom when sufficiently hardened to retain their block-like form.

It also consists in the combination, with a revolving table pierced with two or more series of holes, of a vertically-movable plate or frame with attached pins, stationary guides to limit said plate to a vertical movement, and means for raising said plate so that said pins protrude through one of the series of holes in said table.

It also consists in the combination, with such revolving table having guides upon its upper surface for holding a number of charging-frames in position, of a hopper hinged to an arm extending from a central standard and capable of being adjusted horizontally over a frame, or turned up when said frame is to be removed.

It also consists in the combination, with such revolving table and vertically-movable plate, of a novel arrangement of levers for elevating said plate.

In the accompanying drawings, Figure 1 represents a perspective view of a charging-pan for substances to be treated which are of such a nature that they will not set quickly, so as to retain their form. Fig. 2 is a perspective view of a charging board and frame for substances which will become solid or set quickly, part of the said frame being broken away. Fig. 3 is a perspective view of an apparatus for perforating the substance to be treated while in the molding pan or frame; and Fig. 4 is a partial vertical section of the same.

Similar letters of reference designate corresponding parts in all the figures.

The charging-pan A (represented in Fig. 1) is intended for use with materials which do not immediately become solid or set, but remain in a plastic condition for some time. The sides of this charging-pan are made flaring from the bottom upward, so that when finally set the contents of the pan may be removed in the shape of a block by turning the pan upside down. The bottom of the pan is perforated and is provided with cleats *a*.

For molding substances which quickly become solid or set into blocks I use the molding-board B and frame C, (represented in Fig. 2.) The frame C has its sides flaring from the top downward, so that when the substance has set the frame may be readily lifted off, leaving the substance in the form of a block on the molding-board B. This molding-board is perforated like the bottom of the molding-pan A, and has upon its under side cleats *a*, like those upon the pan A.

The substance, after being placed in the molding-pan or molding-frame, may be perforated, as shown in Fig. 1, at *b*, and I form as many perforations as can be made without breaking the mass, so as to expose as large an amount of surface as possible.

I have represented in Figs. 3 and 4 an apparatus which may be conveniently used for perforating the contents of the pan A or frame C.

D designates a table adapted to revolve upon a central standard, *c*, and resting at its outer edge upon rollers *d*, to enable it to be more easily revolved. It is provided with several series (here represented as three in number) of holes, *e*, corresponding in number to the perforations to be made in the contents of the pan or frame, and also with blocks *f*, serving to hold the pans or frames in proper position on the table, as shown in Fig. 3.

E designates a plate or frame vertically movable in stationary guides *g*, and provided with a number of upwardly-extending pins, *h*, corresponding in number and position with one series of holes, *e*, in the table D. By means of a lever, F, the plate E may be raised into the position shown in Fig. 4, so that its pins will be projected partially or wholly through the contents of the pan or frame on the table above it, and on being depressed will leave the said contents honeycombed with perforations.

G designates a lever connected to the lever F by a cord, i, passing over pulleys j, and placed so that it may be conveniently reached from the side of the table on which is the perforating apparatus.

H designates a hopper hinged to an arm, k, extending from the standard c, and which may be adjusted into the position shown in dotted outline in Fig. 3, over the molding-frame C, when the latter is to be filled or turned up, when the frame is to be replaced by another.

In operating my apparatus, the pan or frame having been placed on the table D, the latter is revolved so as to bring the pan or frame over the plate or frame E and pins h. The hopper H is then adjusted over the frame C, and the latter filled with the substance to be molded in a plastic state. The plate E and pins h are then raised by the lever G, and when depressed the substance is left filled with perforations. If the nature of the substance is such that it becomes solid quickly the frame C may be at once removed, leaving a perforated block, O, (represented in Fig. 3.) If the nature of the substance is such that it remains plastic for some time, pans like that represented in Fig. 1 are used.

By my invention I provide a simple and easily-operated apparatus whereby various kinds of substances may be molded into perforated blocks.

What I claim as my invention, and desire to secure by Letters Patent, is—

1. The combination, with the charging-frame C, of the perforated charging-board B, substantially as and for the purpose specified.

2. The combination, with a revolving table pierced with two or more series of holes, of a vertically-movable plate or frame provided with pins, stationary guides to limit said plate to a vertical movement, and mechanism for raising said plate, whereby the said pins are caused to protrude through a series of holes in the said table, substantially as specified.

3. The combination, with a table having guides upon its upper surface for holding a number of frames in position, of a hopper hinged to an arm extending from a central standard and capable of being adjusted horizontally over a frame or turned up when said frame is to be removed, substantially as specified.

4. The combination, with the revolving table D, of the plate or frame E, provided with pins h, the levers F G, and cord i, substantially as and for the purpose specified.

ALBERT STEARNS.

Witnesses:
HENRY T. BROWN,
FREDK. HAYNES.